United States Patent
Wilhelm et al.

(10) Patent No.: US 9,764,719 B2
(45) Date of Patent: Sep. 19, 2017

(54) METHOD AND DEVICE FOR AVOIDING A POSSIBLE SUBSEQUENT COLLISION AND FOR REDUCING THE ACCIDENT CONSEQUENCES OF A COLLISION

(71) Applicant: Robert Bosch GmbH, Stuttgart (DE)

(72) Inventors: Ulf Wilhelm, Rutsheim (DE); Sybille Eisele, Hessigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/899,989

(22) PCT Filed: May 15, 2014

(86) PCT No.: PCT/EP2014/059924
§ 371 (c)(1),
(2) Date: Dec. 18, 2015

(87) PCT Pub. No.: WO2014/202289
PCT Pub. Date: Dec. 24, 2014

(65) Prior Publication Data
US 2016/0137177 A1    May 19, 2016

(30) Foreign Application Priority Data
Jun. 20, 2013   (DE) .................. 10 2013 211 651

(51) Int. Cl.
*B60T 17/00*  (2006.01)
*B60T 8/1755*  (2006.01)
(Continued)

(52) U.S. Cl.
CPC .......... *B60T 8/17558* (2013.01); *B60T 7/22* (2013.01); *B60T 17/18* (2013.01); *G08G 1/166* (2013.01);
(Continued)

(58) Field of Classification Search
None
See application file for complete search history.

(56) References Cited

U.S. PATENT DOCUMENTS 6,017,102 A *  1/2000  Aga .................... B60T 7/12
                                              303/125
8,903,620 B2 *  12/2014  Hammoud ............ B60T 7/22
                                              701/36
(Continued)

FOREIGN PATENT DOCUMENTS

DE    102005059903 A1    6/2007
DE    10 2007 019 991    10/2008
(Continued)

*Primary Examiner* — Angela Ortiz
*Assistant Examiner* — Garrett Evans
(74) *Attorney, Agent, or Firm* — Norton Rose Fulbright US LLP; Gerard Messina

(57) ABSTRACT

A method and a device for avoiding a possible subsequent collision and for reducing the accident consequences of a collision, in which after a first collision of the vehicle with a further road user has taken place, an automatic braking intervention by a vehicle safety system is released according to a braking model by ascertaining vehicle data from the handling of the host vehicle, buffering the vehicle data ascertained in a memory, inferring the category of the road being traveled on at the moment from the buffered vehicle data, determining an initial distance as a function of the road category determined, and ascertaining the condition for releasing the brake using this initial distance.

12 Claims, 3 Drawing Sheets

(51) Int. Cl.
  *B60T 7/22*    (2006.01)
  *G08G 1/16*    (2006.01)
  *B60T 17/18*   (2006.01)
  B60W 30/08    (2012.01)
  G08G 1/0962   (2006.01)

(52) U.S. Cl.
  CPC ..... *B60T 2201/024* (2013.01); *B60T 2210/32* (2013.01); *B60T 2210/36* (2013.01); *B60T 2260/08* (2013.01); *B60W 2030/082* (2013.01); *G08G 1/09626* (2013.01)

(56) References Cited

U.S. PATENT DOCUMENTS

2007/0008090 A1* 1/2007 Gertsch .................. B60P 1/045
                                          340/435
2007/0032943 A1   2/2007 Okabe
2009/0299578 A1  12/2009 Lucas et al.
2012/0004819 A1   1/2012 Lu et al.
2012/0188100 A1   7/2012 Min et al.

FOREIGN PATENT DOCUMENTS

| JP | 2003127702 A | 5/2003 |
| JP | 2006142904 A | 6/2006 |
| JP | 2007232516 A | 9/2007 |
| WO | WO 2004/110809 | 12/2004 |

\* cited by examiner

METHOD AND DEVICE FOR AVOIDING A POSSIBLE SUBSEQUENT COLLISION AND FOR REDUCING THE ACCIDENT CONSEQUENCES OF A COLLISION

FIELD OF THE INVENTION

The present invention relates to a method and a device for avoiding a possible subsequent collision and for reducing the accident consequences of a collision, in which after a first collision of the vehicle with a further road user has taken place, an automatic braking intervention by a vehicle safety system is released according to a braking model by ascertaining vehicle data from the handling of the host vehicle, buffering the vehicle data ascertained in a memory, inferring the category of the road being traveled on at the moment from the buffered vehicle data, determining an initial distance as a function of the road category determined, and ascertaining the condition for releasing the brake using this initial distance.

BACKGROUND INFORMATION

The German Patent 10 2007 019 991 A1 discusses a method for avoiding a rear-end collision after the triggering of an automatic braking intervention by a vehicle safety system. In that case, the risk and the severity of a possible rear-end collision by a following vehicle is able to be reduced considerably if a model is used for the approach of a hypothetical vehicle. Within the framework of this model, a condition is ascertained for the release of the brake, and the brake is released at least to some extent in response to the occurrence of the condition. In the process, the instant for the release of the brake is determined, in doing which, particularly an initial distance and a theoretically conjectured behavior of a hypothetical following vehicle being assumed for this purpose. In this context, the release condition for the brake of the front vehicle may be a function of the assumed initial distance of the following vehicle from the front vehicle, the initial distance of the following vehicle being obtained, e.g., from the rule of thumb "half of the speed indicator" or an arbitrary multiple of the velocity of the host vehicle.

SUMMARY OF THE INVENTION

An aspect of the present invention is to indicate a method and a device for avoiding a possible subsequent collision and for reducing the accident consequences of a collision, in which after a first collision of the vehicle with a further road user has taken place, an automatic braking intervention by a vehicle safety system is released according to a braking model. Automatic emergency brake systems which automatically trigger and possibly implement a vehicle deceleration upon detection of a collision situation are gaining increasing acceptance in the marketplace. The risk of collision and the anticipated collision severity may be further reduced not only for the host vehicle but also for the following traffic by the fact that after an emergency braking has been triggered, the automatic deceleration is not continued until reaching a standstill, but rather, the vehicle brake is released again in response to the presence of certain release conditions.

According to the present invention, the risk of collision and the collision severity may be further reduced in the case of a vehicle that does not necessarily need a driving environment sensor system, by calculating the release condition on the basis of a braking model that is obtained from a hypothetically following vehicle with characteristic movement. In order to further improve this model, the initial distance of a hypothetically following vehicle from the host vehicle upon triggering of the automatic vehicle braking may be made variable and be adapted to the type of road category being used at the moment. According to the present invention, this is achieved by the features set forth in the independent claims.

Advantageous further developments and refinements are derived from the dependent claims.

From the instantaneous handling of the host vehicle, vehicle data are able to be ascertained which are buffered in a memory. From this buffered vehicle data, it is possible to infer the category of the road currently being traversed, as a function of the road category determined from the vehicle data, an initial distance is ascertained that indicates a characteristic distance of a hypothetically following vehicle at the instant the automatic braking is triggered. Furthermore, by adapting this initial distance to the road category currently being used, the condition for the release of the brake after a first collision has taken place is determined using this adapted initial distance, thereby making it possible to reduce the risk of collision and the severity of collision with following vehicles.

Within the scope of the present invention, under the term road category is understood to be the type and structural condition of the road currently being used. Thus, for example, the road category may distinguish between a turnpike and a country road, or urban traffic within a community may be inferred, thereby permitting a very accurate assumption about the type of road currently being traversed. Additionally or alternatively, it is also possible to classify the road category according to whether there is oncoming traffic, and whether the oncoming traffic is traveling in structurally separate traffic lanes, as is the case, for example, for turnpikes, where the two directions of travel are separated by a median strip and/or guardrails.

The invention may be further configured in advantageous manner by determining the road category presently being used based on the stored driving data, by comparing the stored driving data to patterns stored for each road category. Furthermore, it may be advantageous if the driving data of the vehicle are made up of one or more of the following variables that are determined with the aid of on-board sensors. In this context, in particular, the velocity of the host vehicle should be mentioned; in addition, the acceleration and deceleration of the host vehicle may be provided, and the frequency of acceleration and deceleration within a certain period of time or within a predetermined distance traveled; the frequency of gear shifts may be determined; furthermore, the frequency of steering-wheel motions may be determined, as well as additionally or alternatively, the degree of the steering-wheel angles. By determining one or more of the aforementioned variables, it is possible to infer the road category presently being used such as turnpike, interstate highway or urban traffic, or a road with oncoming traffic or a road without oncoming traffic, and consequently also to infer the driving behavior of other road users in the vehicle environment.

In addition, it is advantageous that the patterns stored for determining the road category being used at the moment are ascertained heuristically by covering typical road categories, gathering the vehicle data associated with them, and from that, deriving patterns that make it possible to determine the road category. It is further possible to additionally use map information of a navigation system to determine the road category being used at the moment.

Navigation systems are very widely prevalent in vehicles today, such a system being equipped with a receiver which permits determination of the instantaneous position, and in addition, is able to determine the instantaneous location of the host vehicle based on stored map information. By knowledge of the instantaneous location and the information from the map data about the type of road being traveled on at the moment, the determination of the road category may additionally be checked for plausibility with the aid of a navigation system. Furthermore, it is likewise conceivable on the basis of the determination of the road category currently being used, with the aid of a navigation system, to over the course of time further individualize and/or refine the patterns stored in the memory for the road category.

The driving data gathered by the on-board sensors are stored in the vehicle for a certain period of time or for the duration of a certain distance traveled, in order from these data, to be able to perform a comparison with the stored patterns. These vehicle data may be stored by a ring buffer, into which the vehicle data acquired are continually written, and when the memory is completely full, the oldest data present are overwritten by new. Advantageously, the result is that the data stored in the memory may be assigned to a measuring window which represents a predetermined duration or a predetermined distance traveled, and always contains the most up-to-date data.

It is further advantageous that the recording rate of the memory into which the vehicle data, such as the vehicle's own velocity, vehicle acceleration, acceleration frequency, gear-shift frequency, frequency of steering-wheel motions and/or degree of the steering-wheel angles are written and stored, is variable. In this context, the recording rate, thus, the frequency per unit of time in which data are stored, may be altered as a function of the road category currently determined. As a consequence, in driving situations where there are no rapid changes in the vehicle data, it is possible not to record the vehicle data so frequently, and in rapidly changing driving situations which result typically due to the road category being used, a more frequent recording rate may be provided. It is also conceivable to alter only some of the vehicle data listed as a function of the road category currently determined, and to record other variables, which are ascertained within the scope of the vehicle data, with a recording rate independent of the road category currently determined.

Furthermore, it is especially advantageous if the vehicle additionally has a driving environment sensor system, thereby making it possible to ascertain distances and/or relative velocities of other road users and to make this information available for the method of the present invention. Driving environment sensor systems of this kind may be provided for modern driver assistance systems, are made up of a radar sensor, lidar sensor or video sensor and, e.g., determine distances and/or relative velocities of road users or traffic objects in front or behind. The knowledge of the distances and/or relative velocities of other road users or traffic objects, even if they are only ascertained in the forefield of the vehicle, permits a more precise determination of the road category presently being used and therefore also allows a more precise determination of the distance of a hypothetically following road user without determining or measuring it directly.

Particularly significant is the realization of the method according to the present invention in the form of a control element provided for a control unit of an automatic emergency braking function of a motor vehicle. In this context, a program that is executable on a computing element, particularly on a microprocessor or signal processor, and is suitable for implementing the method according to the present invention, is stored in the control element. In this case, the present invention is thus realized by a program stored in the control element, so that this control element provided with the program constitutes the present invention in the same way as does the method, for whose execution the program is suitable. In particular, an electrical storage medium, for example, a read-only memory, may be used as a control element.

Additional features, applications and advantages of the present invention are derived from the following description of exemplary embodiments of the present invention, which are illustrated in the figures of the drawing. In this context, all of the features described or represented, alone or in any combination, form the subject matter of the present invention, regardless of their combination in the patent claims or their antecedent reference, and regardless of their wording and representation in the specification and in the drawing, respectively.

Exemplary embodiments of the present invention are explained below with reference to the drawings.

DETAILED DESCRIPTION

Figure 1:
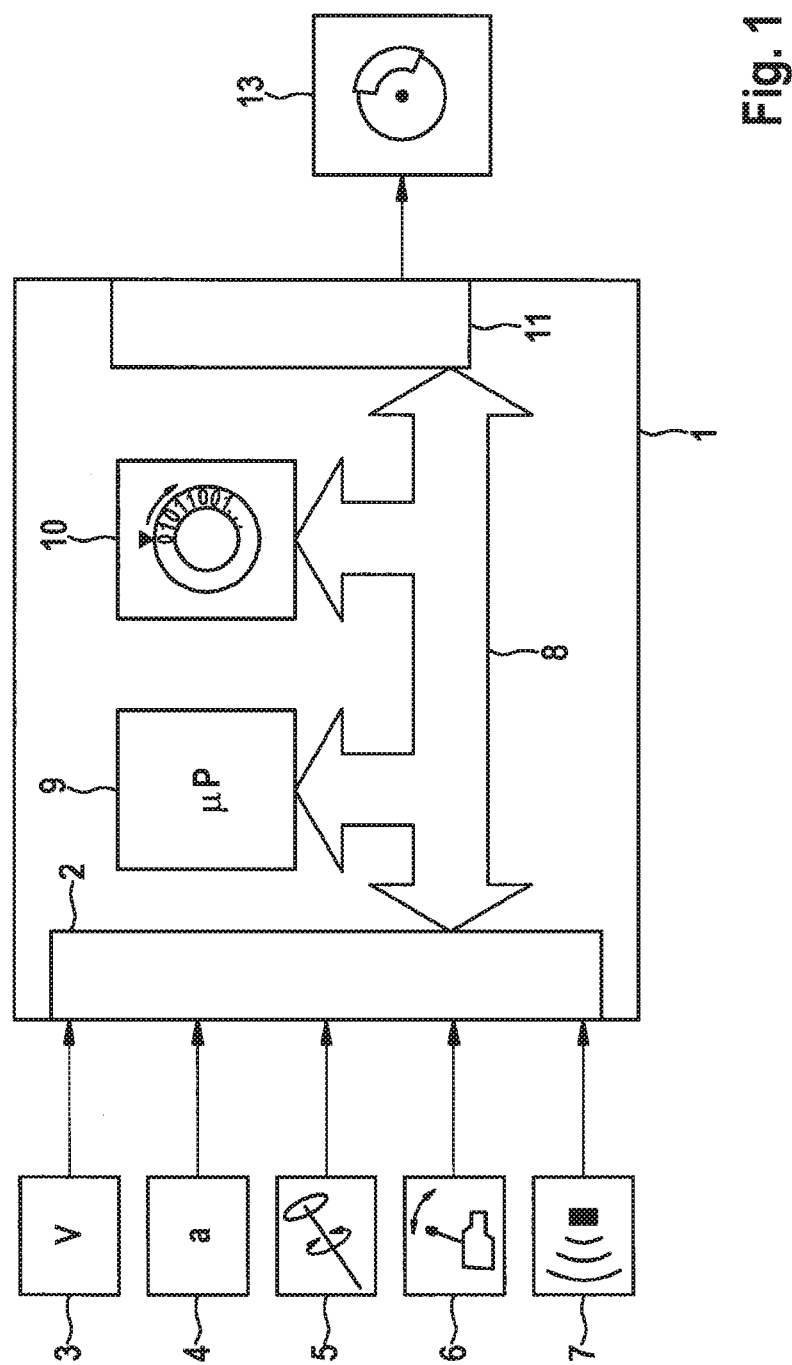
FIG. 1 shows a schematic exemplary embodiment of the device according to the present invention.

FIG. 1 shows device 1 of the present invention for determining initial distance $d_0$. Device 1 for determining initial distance $d_0$ is provided by an input circuit 2 with vehicle data from various vehicle-internal sensors, which are further evaluated within the scope of the method according to the present invention. In this case, data from a velocity sensor 3 are supplied to input circuit 2. Velocity sensors are present in all vehicles, since they must be included within the framework of an ABS or ESP control or within the framework of the representation of the velocity in the speedometer. In addition, signals from an acceleration sensor 4 are fed to input circuit 2. Acceleration sensor 4 measures not only vehicle accelerations, but also vehicle decelerations, and is able to ascertain and transmit both the accelerations and decelerations in the longitudinal direction of the vehicle, as well as the accelerations and decelerations in the transverse direction of the vehicle. Not only the magnitude of the acceleration, but also the frequency and the length of time acceleration processes last are evaluated.

In addition, signals from a steering-angle sensor 5 are supplied to input circuit 2 of device 1. In this instance, steering-angle sensor 5 senses the rotational motions of the driver at the steering wheel and is able to detect both the excursion and the frequency and supply them to device 1 of the present invention. It is further conceivable to supply signals from a transmission sensor 6 to input circuit 2 of device 1, transmission sensor 6 being able to detect the gear stage engaged at the moment; however, it may also be configured in such a way that the frequency of gear change, thus, the gearshift frequency, is able to be detected and supplied to input circuit 2 of device 1. Furthermore, signals from a driving environment sensor system 7 may be supplied to input circuit 2. This driving environment sensor system 7 may be made up of one or more radar sensors, lidar sensors, video sensors or ultrasonic sensors and, for example, may be provided within the framework of a parking-assist system or adaptive distance and speed control installed in the vehicle. This driving environment sensor 7 or this driving environment sensor system 7 detects distances and/or relative velocities of other road users and other traffic objects located within the sensing range of the sensor. In this context, it is possible that the driving environment sensor system is a sensor that is oriented in the direction of the vehicle forefield and is provided, e.g., for an adaptive cruise control. The measured quantities and vehicle data supplied by sensors 3 through 7 are fed via input circuit 2 to device 1 for determining the initial distance. From input circuit 2, these data are supplied by a data-exchange device 8, which in particular may take the form of a bus system, to a memory device 10. This memory device 10 may advantageously be realized as a ring-buffer device in which the vehicle data are written in sequence, and as soon as the storage space is completely used, the oldest data are overwritten by the new data.

These vehicle data stored in memory device 10 may in turn be read out via data-exchange device 8 to a calculation device 9 that, for example, may take the form of a microprocessor or signal processor. In this calculation device 9, characteristic values for the movement of the host vehicle may be ascertained from the vehicle data, and these ascertained values may be compared to characteristic patterns that are stored in device 1 for determining the initial distance. These characteristic patterns may be stored in a further memory device (not shown) in device 1, or may be loaded into calculation device 9 at the beginning of the method according to the invention, or may be stored permanently in a subarea of memory device 10 that is not overwritten cyclically. Based on the comparison of the characteristic patterns stored in device 1, to the values determined from the instantaneous driving behavior, it is possible to infer the road category being used at the moment by finding out which of the stored characteristic patterns agrees best with the values determined from the instantaneous driving data. Calculation device 9 is thereby able to determine with high probability whether host vehicle 15 is presently moving on a turnpike or turnpike-like expressway, whether host vehicle 15 is traveling on an urban street in city traffic or is traveling on an interstate highway, and also whether the road category presently being used has directly adjacent traffic lanes for oncoming traffic or whether the oncoming traffic is moving in structurally separate lanes. Based on the determination of the road category presently being used, an adapted initial distance $d_0$ may be determined that is saved, for example, for each road category stored.

If a first collision in which the host vehicle is involved is detected, then an automatic emergency braking is triggered via an algorithm known from the related art. Such an automatic emergency braking is usually carried out with the aid of a braking model, which may also provide that the automatic vehicle braking deceleration be disengaged autonomously at a specific point in time, thereby reducing the collision severity or the risk of collision for following vehicles. To trigger this automatic emergency braking and for the automatic release of the emergency braking, calculation device 9 is able to output control signals via data-exchange device 8, that are output via an output circuit 11 to downstream braking devices 13 or brake-control devices 13, and the vehicle braking deceleration devices are actuated according to the command signals.

Figure 2:
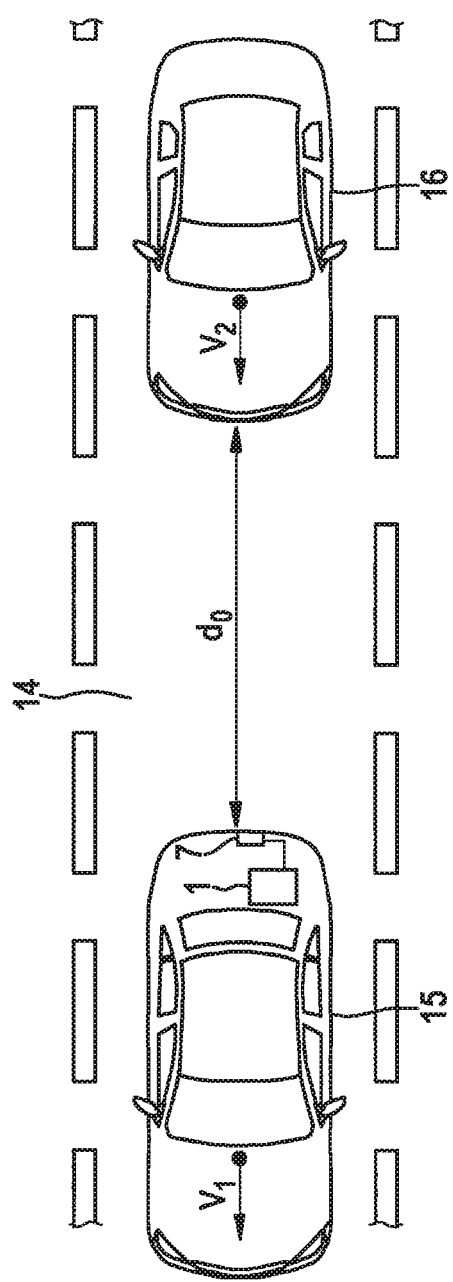
FIG. 2 shows a representation of a typical traffic situation which may occur within the scope of the present invention.

FIG. 2 shows an exemplary traffic situation to more precisely clarify the present invention. In this instance, a traffic lane 14 is drawn in, which is bounded by left and right lane markings. Vehicle 15 equipped with device 1 of the present invention is moving in this traffic lane 14, and is traveling with its own vehicle velocity $V_1$. Device 1 for determining the initial distance may be implemented as a control unit in vehicle 15. Optionally, it is possible to provide a driving environment sensor system 7 which, as shown in FIG. 2, is mounted on the rear end of vehicle 15 and detects additional distance data and relative-velocity data of other road users and traffic objects and supplies these data to device 1 of the present invention. It is also possible that a driving environment sensor system 7 is mounted only on the front of vehicle 15, e.g., within the framework of an adaptive cruise control, and that characteristic distance values of the following traffic are inferred based on the distance values and/or relative-velocity values measured to the front.

Following vehicle 15 equipped with device 1 of the present invention is a further subsequent vehicle 16, that is following preceding vehicle 15 with vehicle velocity $V_2$. In this instance, the distance with which following vehicle 16 is moving behind preceding vehicle 15 is denoted as $d_0$. Should no driving environment sensor system 7 be provided, or should a driving environment sensor system 7 be mounted on the front of preceding vehicle 15, then distance $d_0$ cannot be determined directly, so that distance $d_0$ and velocity $V_2$ of following vehicle 16 are conjectured hypothetically.

Figure 3:
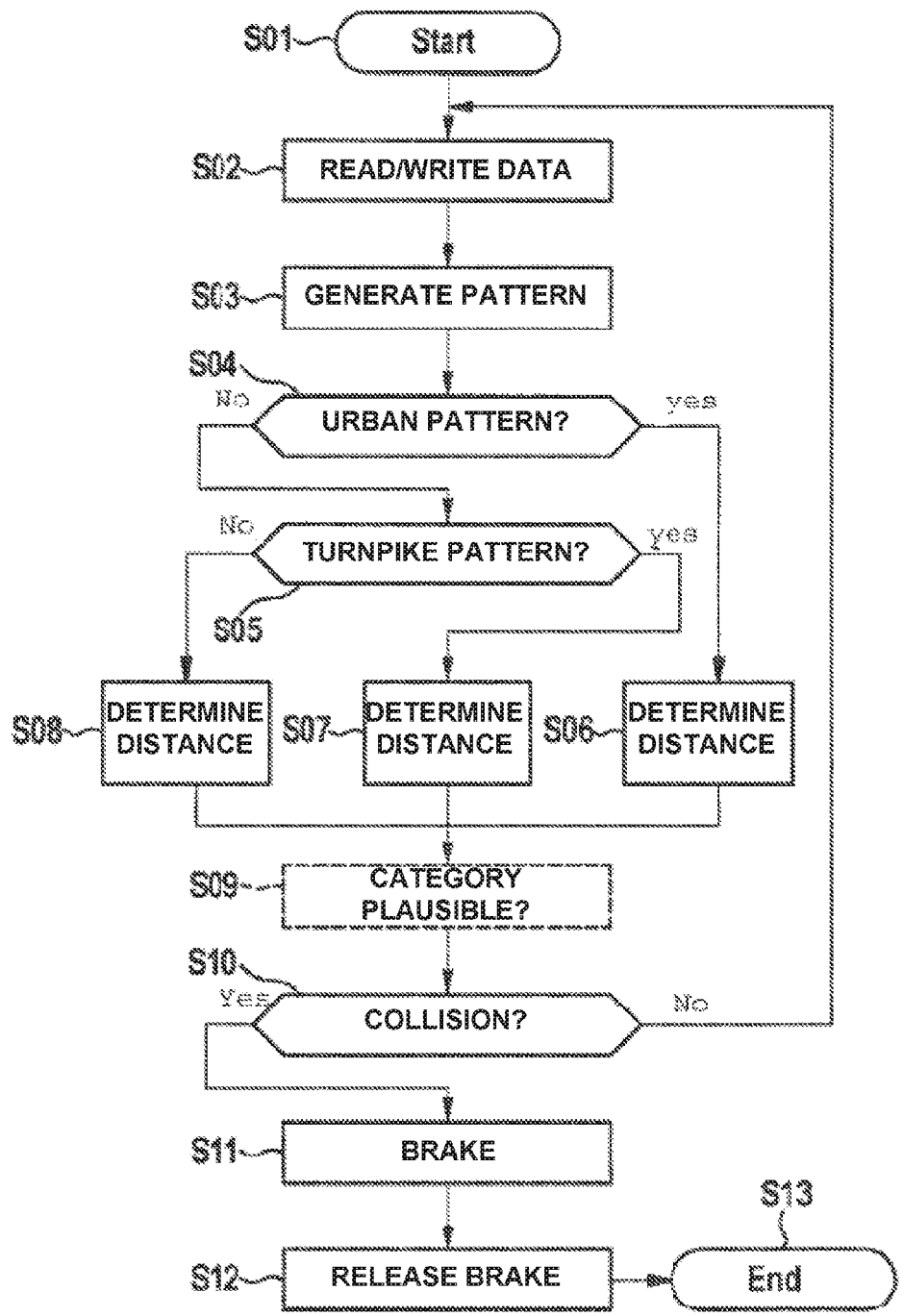
FIG. 3 shows a flow chart of a specific embodiment of the method according to the present invention.

FIG. 3 shows a flow chart that is executed in calculation device 9 of device 1 according to the present invention and is capable of actuating braking deceleration devices 13 in such a way that the risk of collision and the collision severity after a first collision are further minimized. The method of the present invention starts in step S01 which, for example, may take place with operation of the ignition of vehicle 15 or with activation of an on/off switch of a corresponding system. In following step S02, vehicle data are ascertained by vehicle sensors 3 through 7 and written via input circuit 2 and data-exchange device 8 into a ring buffer 10. The realization of memory device 10 as a ring buffer ensures that the most current vehicle data of a floating measuring window are always made available. From the vehicle data read in step S02, an instantaneous pattern of vehicle data is generated in following step S03. In so doing, vehicle variables such as the vehicle velocity are evaluated, and the frequency of vehicle accelerations and vehicle decelerations as well as their amplitude may be considered; it may further be provided to evaluate a steering-angle sensor signal with regard to the extent of the steering-wheel motion and/or with regard to the frequency of the steering-wheel motions and to evaluate a transmission signal that recognizes the gear stage engaged at the moment and/or detects the frequency of gear changes.

When the instantaneous pattern has been determined from the vehicle data presently available, in next step S04, it is checked whether the instantaneous pattern agrees with a pattern for urban traffic stored in device 1. If there is very high agreement between the instantaneously determined pattern and the pattern stored for urban traffic, then step S04 branches to "yes" and the method is continued in step S06. If the agreement in step S04 is not very high or lies below a predetermined threshold value, then step S04 branches to "no" and the method is continued in step S05, in which it is further checked whether the instantaneous pattern of current vehicle data agrees with the pattern for turnpike traffic stored in device 1. If high agreement is recognized in step S05 between the instantaneous pattern and the pattern stored for turnpike traffic, then step S05 branches to "yes" and the method is continued in step S07. On the other hand, if it is ascertained in step S05 that the agreement between the instantaneous pattern and the pattern stored for turnpike traffic is low or lies below a further predetermined threshold value, then step S05 branches to no and the method is continued in step S08. In steps S06, S07 and S08, in each case an initial distance $d_0$ typical for the road category recognized is now determined and used for the further method. If it was found in step S04 that it is highly probable the vehicle is currently in urban traffic, then in step S06, an initial distance $d_0$ for urban traffic is input into the algorithm. If it was determined in step S05 that it is very highly probable that the vehicle is moving on a turnpike or a turnpike-like expressway, then in step S07, an initial distance $d_0$ for turnpike traffic is loaded into the algorithm and further used.

If it was ascertained in steps S04 and S05, respectively, that it is highly improbable the vehicle is moving either in city traffic or on the turnpike, it is then inferred that the vehicle is moving on a country road or highway, and in step S08, an initial distance $d_0$ for interurban traffic is loaded into the algorithm. Distances $d_0$ for the specific road category are characteristic distance values that are stored in device 1 and are read out depending on the road category recognized. After determining initial distance $d_0$ in one of steps S06, S07 or S08 as a function of the road category being used at the moment, the method of the present invention is continued in step S10.

Optionally, before step S10, a step S09 may be provided in which, given the presence of a navigation system in preceding vehicle 15, based on the instantaneously ascertained position and its agreement in the map information, the road category determined with the aid of the pattern comparison may additionally be checked for plausibility. To that end, it is necessary that the map information contain additional information as to the road category of the route currently being traversed. This optional step S09 for checking the plausibility of the road category being used is not absolutely necessary and may be omitted for vehicles without a navigation system, the road category then being determined solely on the basis of the decisions in steps S04 and S05.

In following step S10, it is determined whether a first collision of host vehicle 15 with a further road user has taken place. In the normal case, this check in step S10 will turn out negatively, since no first collision has taken place, and step S10 subsequently branches to "no", whereupon the method returns to step S02 and the method steps described are run through iteratively all over again. If a first collision with a further road user was ascertained in step S10, then step S10 branches to "yes", and in subsequent step S11, an automatic emergency braking is initiated in a manner that braking deceleration devices 13 of vehicle 15 are controlled correspondingly by device 1. To reduce the danger of collision or the severity of a collision with possible following vehicles, the automatic emergency braking which was initiated in step S11 may be ended automatically by controlled release of the braking deceleration devices in a manner that in step S12, a brake release takes place provided that, using appropriate initial distance $d_0$, an instantaneously calculated braking model reveals that the collision severity may be further reduced by a brake release.

In this connection, with regard to the braking model, reference is made to the disclosure in the Laid Open Print DE 10 2007 019 991 in which this model was described, and whose disclosure content is intended to be included in its entirety by the present patent application.

If it was ascertained in step S12 that a brake release is suitable for reducing the collision severity, in doing which, initial distance $d_0$, which is matched to the current road category, having been used, then the method of the present invention is ended in step S13.

What is claimed is:

1. A method for avoiding a possible subsequent collision and for reducing an accident consequence of a collision, the method comprising:
   releasing, after a first collision of vehicle with a further road user has taken place, an automatic braking intervention by a vehicle safety system according to a braking model;
   ascertaining vehicle data from a handling of the host vehicle, the ascertained vehicle data are buffered in a memory;
   inferring the category of the road being traveled on at the moment from the buffered vehicle data;
   determining an initial distance as a function of the road category, wherein the initial distance indicates a characteristic distance of a hypothetically following vehicle; and
   ascertaining the condition for releasing the brake using this initial distance.

2. The method of claim 1, wherein the road category is used at the moment is determined based on the stored driving data, by comparing the stored driving data to patterns stored for each road category.

3. The method of claim 1, wherein at least one of the following categories is provided as a road category: urban traffic, interurban traffic, turnpike traffic, and a combination of these categories.

4. The method of claim 2, wherein the road category additionally distinguishes whether the road being traveled on at the moment has oncoming traffic.

5. The method of claim 1, wherein the patterns stored for the road categories are determined from heuristically ascertained driving data, including from the driving data of the host vehicle.

6. The method of claim 1, wherein in addition, map information of a navigation system is used to determine the road category being used at the moment.

7. The method of claim 1, wherein the driving data are made up of at least one of: a velocity of the host vehicle, an accelerations and deceleration of the vehicle, a frequency of acceleration and deceleration, a frequency of gear shifts, a frequency of steering-wheel motions, a degree of the steering-wheel angles, and a combination thereof.

8. The method of claim 1, wherein in addition to the driving data, data are ascertained and processed by a driving environment sensor system, which is configured to determine and make available distances and/or relative velocities of further road users.

9. The method of claim 1, wherein the data are stored in a ring buffer.

10. The method of claim 1, wherein the recording rate of the memory is alterable as a function of the instantaneously ascertained road category.

11. A device for avoiding a possible subsequent collision and for reducing an accident consequence of a collision, comprising:
    a detecting arrangement to detect a first collision of the vehicle with a further road user;

a releasing arrangement to release, after a first collision has taken place, a braking deceleration device by the device automatically according to a braking model;

wherein vehicle data are supplied by vehicle sensors to the device, the vehicle data supplied are buffered in a memory of the device, the category of the road being traveled on at the moment is inferred from the buffered vehicle data with the aid of a processing device, an initial distance stored in the device is read out as a function of the road category determined, wherein the initial distance indicates a characteristic distance of a hypothetically following vehicle, and the device ascertains the condition for the release of the braking deceleration device using the initial distance, and outputs it to the braking deceleration device.

12. The device of claim 11, wherein data from a driving environment sensor system are supplied to the device, the driving environment sensor system ascertaining and making available distances and/or relative velocities of further road users.

* * * * *